United States Patent [19]

Stall et al.

[11] Patent Number: 5,071,392

[45] Date of Patent: Dec. 10, 1991

[54] PROCESS AND DEVICE FOR CONTROLLING LOCKING DIFFERENTIALS

[75] Inventors: Eugen Stall, Stolberg; Robert Rickell, Siegburg, both of Fed. Rep. of Germany

[73] Assignee: GKN Automotive AG, Siegburg, Fed. Rep. of Germany

[21] Appl. No.: 432,051

[22] Filed: Nov. 6, 1989

[30] Foreign Application Priority Data

Nov. 8, 1988 [DE] Fed. Rep. of Germany ....... 3837862

[51] Int. Cl.$^5$ .............................................. F16H 1/44
[52] U.S. Cl. .................................... 475/150; 475/153; 364/426.03
[58] Field of Search .................. 475/84, 150, 231, 249, 475/153, 154, 156; 364/426.02, 426.03; 192/103 F, 103 R; 180/197

[56] References Cited

U.S. PATENT DOCUMENTS

| 3,945,475 | 3/1976 | Khatti | 192/4 A |
|---|---|---|---|
| 4,156,547 | 5/1979 | Marsh | 475/84 X |
| 4,484,280 | 11/1984 | Brugger et al. | 364/426.03 |
| 4,671,373 | 6/1987 | Sigl | 180/197 |
| 4,736,814 | 4/1988 | Yogo et al. | 364/426.03 X |
| 4,760,893 | 8/1988 | Sigl et al. | 364/426.03 X |
| 4,841,808 | 6/1989 | Ouchi et al. | 475/150 X |
| 4,872,373 | 10/1989 | Ouchi et al. | 74/866 X |

FOREIGN PATENT DOCUMENTS

| 0186122 | 4/1989 | European Pat. Off. . |
|---|---|---|
| 310094 | 4/1989 | European Pat. Off. . |
| 0311139 | 4/1989 | European Pat. Off. . |
| 0179066 | 5/1989 | European Pat. Off. . |
| 1806671 | 7/1970 | Fed. Rep. of Germany . |
| 3225459 | 1/1983 | Fed. Rep. of Germany . |
| 3545545 | 12/1986 | Fed. Rep. of Germany . |
| 3637820 | 5/1987 | Fed. Rep. of Germany . |
| 3708063 | 9/1987 | Fed. Rep. of Germany . |
| 3808787 | 9/1988 | Fed. Rep. of Germany . |
| 3832768 | 4/1989 | Fed. Rep. of Germany . |
| 3835085 | 4/1989 | Fed. Rep. of Germany . |
| 3737329 | 5/1989 | Fed. Rep. of Germany . |
| 3836471 | 5/1989 | Fed. Rep. of Germany . |
| 3836713 | 5/1989 | Fed. Rep. of Germany . |
| 3841815 | 7/1989 | Fed. Rep. of Germany . |
| 62-20724 | 1/1987 | Japan . |

Primary Examiner—Allan D. Herrmann
Assistant Examiner—Benjamin Levi
Attorney, Agent, or Firm—Toren, McGeady & Associates

[57] ABSTRACT

A process for continuously controlling the degree of locking of open differential drives in a driven axle of a multi-axle vehicle, in the case of which a nominal value $\Delta_{v\,soll}$ of the differential speed at the wheels driven via the differential gear is determined as a function of the vehicle speed $v_F$ determined at the non-driven wheels and which records the wheel speed differential $\Delta_{v\,ist}$ between the wheels driven via the differential gear, which wheel speed differential $\Delta_{v\,ist}$ is readjusted by varying the locking effect on the nominal value $\Delta_{v\,soll}$ of the differential speed always deviating from zero.

9 Claims, 3 Drawing Sheets

PROCESS AND DEVICE FOR CONTROLLING LOCKING DIFFERENTIALS

BACKGROUND OF THE INVENTION

The invention relates to a process and device for continuously controlling the degree of locking of externally controlled locking differentials in a driven axle of a multi-axle vehicle. Externally controlled locking differentials, in this context, are in contrast to standard torque or speed sensing locking differentials.

Locking differentials with external control means usually comprise plate couplings by means of which the open differential may be locked. By using suitable adjusting members it is possible to continuously vary by hydraulic means the locking torque transmitted by the plate coupling. This is important in order to make it possible, largely by way of electronic control, to adapt the locking torque in respect of traction and driving stability to the different slip and friction conditions between the tires and the road surface. With the help of speed sensors at the driven and non-driven axle it is possible to identify the slip conditions of the driving wheels and to prevent wheel spinning by controlling the locking differential.

There are prior art regulating processes which, as a function of the driving situation determined by the wheel speed sensors, set a certain locking effect, and for different driving situations there exist a multitude of different reactions demonstrated by the locking coupling. In view of the different relationships between interfering factors, this leads to complex and therefore intricate and expensive control strategies.

With prior art differentials of the above type, a high degree of slip at the driven axle leads to the locking coupling being completely closed so that with a 100% locking effect both wheels of the driven axle rotate at exactly the same speed. In such a case, evaluation of the speed no longer allows it to be determined whether there is still a need for actuating the locking coupling. Therefore, changes in gripping conditions, wheel load, steering angle or driving torque (interfering factors) can no longer be taken into account for adapting and setting the correct locking torque. Temporarily eliminating the locking effect in order to use the behavior of the wheel speeds for calculating the actual or corrected locking effect for the next time interval would be disadvantageous for driving stability because of a locking torque which increases and decreases at intervals. Actuating a controlled locking differential as described above is particularly disadvantageous for front wheel drive vehicles because of negative steering effects.

SUMMARY OF THE INVENTION

Accordingly, it is an object of the present invention to provide a process for continuously controlling the degree of locking of externally controlled locking differentials which reacts quickly when slip conditions at the driven axle change as a result of changes in the interfering factors such as the gripping nature of the road surface, wheel loads and other wheel forces.

Pursuant to this object, and others which will become apparent hereafter, one aspect of the present invention resides in that a nominal value $\Delta v\,_{soll}$ of the differential speed for the driven wheels is determined as a function of the vehicle speed $v_F$ determined at the non-driven wheels. The wheel speed differential $\Delta v\,_{ist}$ between the driven wheels is recorded and readjusted for offsetting the influence of the interfering factors by varying the locking effect on the nominal value $\Delta v\,_{soll}$ of the differential speed always deviating from zero, preferably as long as the wheel speed differential is greater than the nominal value of the differential speed. Since the locking differential is never completely locked, the two speed sensors at the wheels of the driven axle are always able to detect different adhesion locking conditions, the basic principle of the control strategy in accordance with the invention being that the locking coupling of the differential gear should never have a 100% locking effect, but that a limit to the wheel speed differential should always be built in. As long as this limit is below the nominal value of the differential speed, the control circuit is not actuated. By means of such closed control loop control means for the locking torque it is possible to take into account the effect of further interfering factors in addition to changes in the friction valves, for instance changes in the wheel load, the steering angle and the driving torque, indirectly via recording the speed. In a preferred embodiment, especially the nominal value of the differential speed is influenced as a function of the steering angle $\delta_L$ determined especially via the speed recorded at the steered wheels.

In a further embodiment, the process is carried out in such a way that the associated nominal value of the differential speed is low and constant at low driving speeds and increases, especially linearly, at higher driving speeds.

The nominal value of the differential speed assumed at low driving speeds and during starting is selected so as to be as low as possible so that even with the slightest spinning of a driving wheel the locking effect occurs. With an increasing driving speed and an increasing steering angle, the nominal value of the differential speed increases. During braking or when actuating the brake pedal, the invention proposes that the locking effect should be eliminated as quickly as possible so that a locking effect of the driven axle influencing the braking operation is prevented. This is particularly important for the functioning of the anti-blocking system.

A device in the form of a closed loop circuit suitable for carrying out the process is insensitive to interfering signals and even with an actuated locking coupling of the locking differential, it is capable of continuously readjusting the coupling torque in accordance with adhesion locking conditions by evaluating the individual wheel speeds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
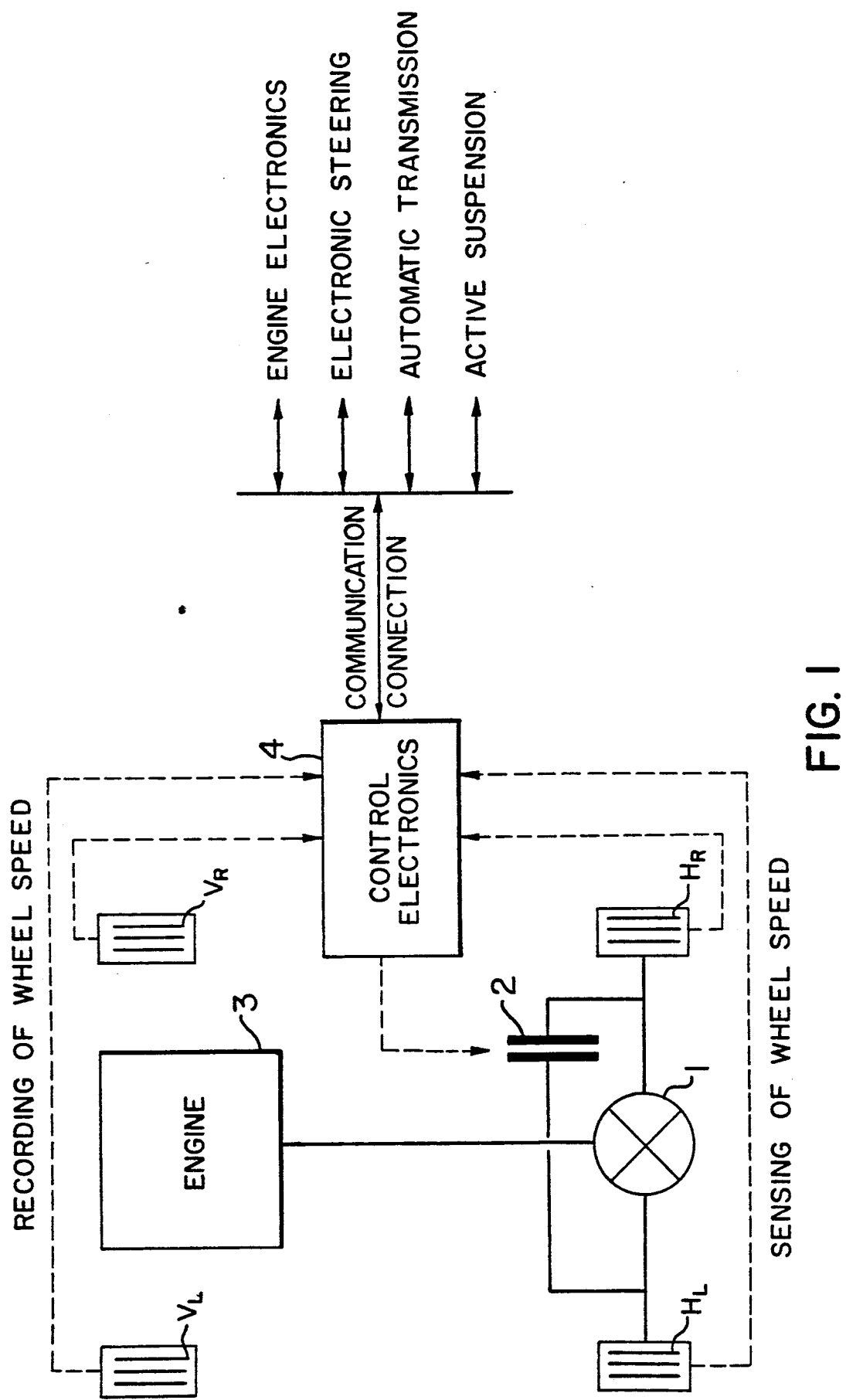
FIG. 1 shows a diagram explaining the influencing factors.

FIG. 1 shows the non-driven front wheels $V_L$, $V_R$, the rear wheels $H_L$, $H_R$ connected via a differential gear 1 to a locking coupling 2, an internal combustion engine 3 and an electronic control system 4—all forming part of the schematic vehicle drive. Apart from indicating the speed sensing of all four wheels, the diagram indicates by arrows the interrelationships between the electronic control system and the engine control system, the steering system, the automatic transmission and active wheel suspension, whereas the locking coupling is directly connected to the electronic control system 4.

Figure 2:
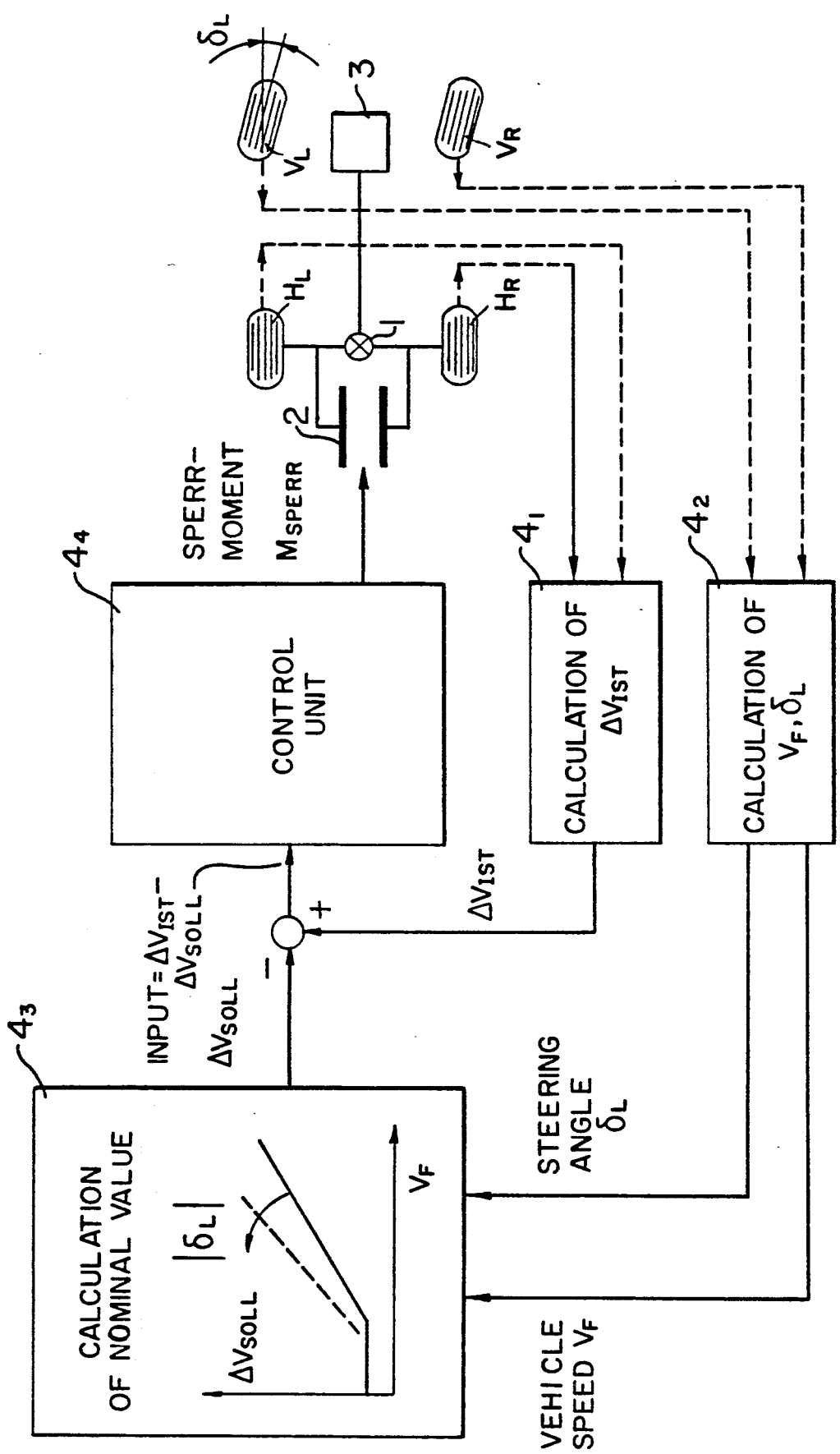
FIG. 2 shows a diagram of a first embodiment of the control circuit in accordance with the invention.
Figure 3:
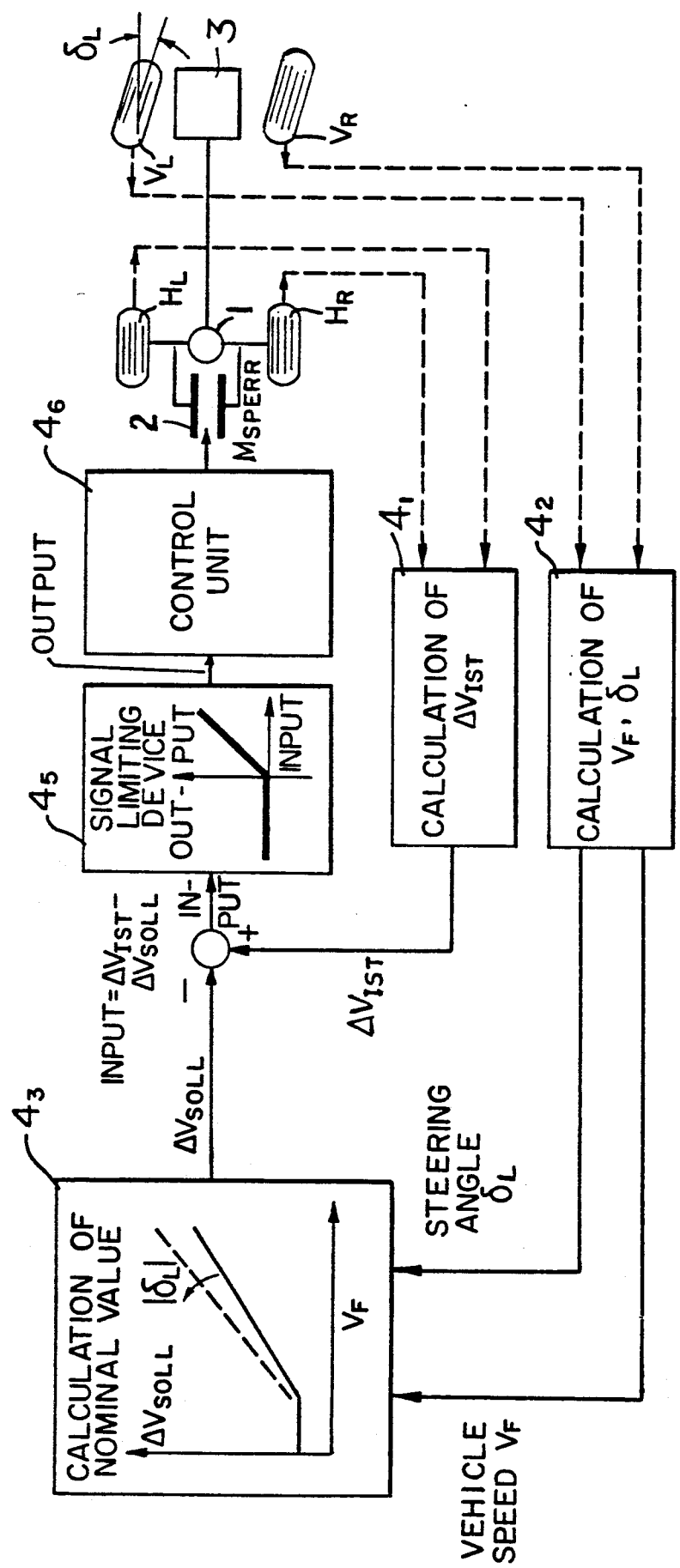
FIG. 3 shows a diagram of a second embodiment of the control circuit in accordance with the invention.

FIGS. 2 and 3 again indicate the non-driven front wheels $V_L$, $V_R$, the driven rear wheels $H_L$, $H_R$, the differential gear 1, the locking coupling 2 and the internal combustion engine 3. The electronic control unit consists of several units, i.e. a unit $4_1$ for calculating the actual speed differential value $\Delta_{v\ ist}$ from the wheel speed at the driven wheels, a unit $4_2$ for calculating the driving speed $v_F$ and the steering angle $\delta_L$ at the non-driven wheels, a unit $4_3$ for calculating the nominal value of the differential speed as a function of the vehicle speed $v_F$ and the steering angle $\delta_L$, an adding member for adding the values of the nominal value $\Delta_{v\ ist}$ of the wheel speed and of the nominal value $\Delta_{v\ soll}$ of the differential speed, a PID control unit $4_4$ for controlling the locking effect of the locking coupling (FIG. 2) and a signal limiting device $4_5$ which outputs no signal if the values added up are positive, as well as a PID control unit $4_6$ (FIG. 3).

While the invention has been illustrated and described as embodied in a process and device for controlling locking differentials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A process for continuously controlling the degree of locking of externally controlling locking differentials in a drive axle of a multi-axle vehicle having driven wheels and non-driven wheels, comprising the steps of:
   determining a nominal value ($\Delta_{v\ soll}$) of differential speed for the driven wheels ($H_L$, $H_R$) as a function of vehicle speed ($V_F$) determined at the non-driven wheels ($V_L$, $V_R$); and
   recording and readjusting the wheel speed differential ($\Delta_{v\ ist}$) between the driven wheels ($H_L$, $H_R$) on the nominal value of the differential speed, for offsetting the influence of interfering factors including gripping conditions, wheel load, steering angle or driving torque, by varying the locking effect, the nominal value ($\Delta_{v\ soll}$) of the differential speed always being different from nil.

2. A process according to claim 1, wherein said recording and readjusting step includes readjusting the wheel speed differential ($\Delta_{v\ ist}$) as long as the wheel speed differential ($\Delta_{v\ ist}$) is greater than the nominal value ($\Delta_{v\ soll}$) of the differential speed.

3. A process according to claim 1, including influencing the nominal value ($\Delta_{v\ soll}$) of the differential speed as a function of steering angle ($\delta_L$) of the non-driven wheels.

4. A process according to claim 3, wherein the detection of steering angle occurs via the wheel speed differential recording at the non-driven wheels.

5. A process according to claim 1, including influencing the nominal value ($\Delta_{v\ soll}$) of the differential speed as a function of further factors, including at least one of movements of a wheel suspension and movements of the vehicle body relevant from a driving-dynamical point of view.

6. A process according to claim 1, wherein said nominal value determining step includes determining the nominal value ($\Delta_{v\ soll}$) of the differential speed to be low and constant at low vehicle speeds ($v_F$) and increasing at higher vehicle speeds.

7. A process according to claim 6, wherein said nominal value determining step includes determining the nominal value to be linearly increasing at higher vehicle speeds.

8. A process according to claim 1, wherein said recording and readjusting step includes immediately eliminating the locking effect between the driven wheels ($H_V$, $H_R$) when the vehicle is braked.

9. A device for controlling the degree of locking of differential drives (1) having a locking coupling (2) in a driven axle of a multi-axle vehicle, with speed sensors at the driven wheels and at least one speed sensor at a non-driven axle, and with a regulating unit (4), comprising:
   first functional computer means ($4_2$) to which the at least one speed sensor at the non-driven axle ($V_L$, $V_R$) is connected, the computer means calculating vehicle speed ($v_F$) and a value corresponding to steering angle ($\delta$);
   second functional computer means ($4_3$) connected to said first functional computer means ($4_2$), for calculating a nominal value ($\Delta_{v\ soll}$) of a differential speed for wheels of the driven axle ($H_L$), $H_R$) as a function of vehicle speed and said value corresponding to steering angle ($\delta$) or selecting it from a data store in dependence upon speed;
   third functional computer means ($4_1$) to which the speed sensors at the wheels of the driven axle ($H_L$, $H_R$) are connected, for calculating wheel speed differential ($\Delta_{v\ ist}$); and
   fourth computer means for comparing the nominal value ($\Delta_{v\ soll}$) of the differential speed with the wheel speed differential ($\Delta_{v\ ist}$) and, via a functional computer unit with a regulating function ($4_4$), controlling a control member for the locking coupling (2) of the differential drive.

* * * * *